(12) United States Patent
Youn

(10) Patent No.: US 7,319,642 B2
(45) Date of Patent: Jan. 15, 2008

(54) METHOD FOR ADJUSTING FOCUS BIAS IN OPTICAL DISK DEVICE

(75) Inventor: Jeong Chae Youn, Pyungtaek-si (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 672 days.

(21) Appl. No.: 10/765,103

(22) Filed: Jan. 28, 2004

(65) Prior Publication Data

US 2005/0018558 A1    Jan. 27, 2005

(30) Foreign Application Priority Data

Jan. 28, 2003    (KR) ...................... 10-2003-0005556

(51) Int. Cl.
G11B 7/00    (2006.01)
(52) U.S. Cl. ................. 369/44.29; 369/44.26
(58) Field of Classification Search ............ 369/44.34, 369/44.29, 44.26, 44.32, 44.35, 53.34
See application file for complete search history.

(56) References Cited

U.S. PATENT DOCUMENTS 6,240,055 B1 *    5/2001    Takamine et al. ......... 369/44.29
6,680,887 B2 *    1/2004    Shihara et al. ........... 369/44.32
7,065,017 B2 *    6/2006    Nishida .................... 369/47.28
2002/0191504 A1 *    12/2002    Takeda .................... 369/44.29
2003/0147332 A1 *    8/2003    Ichimura et al. ....... 369/112.24
2003/0169649 A1 *    9/2003    Takaoka et al. ......... 369/44.26

FOREIGN PATENT DOCUMENTS

| JP | 11189719 | * | 2/1999 |
| KR | 1999-0035335 | | 5/1999 |
| KR | 2001-0091157 | | 10/2001 |

* cited by examiner

Primary Examiner—Thang V. Tran
Assistant Examiner—Vanessa Coleman
(74) Attorney, Agent, or Firm—Birch, Stewart, Kolasch & Birch, LLP

(57) ABSTRACT

Disclosed is a method for adjusting focus bias in an optical disk device. When a focus bias adjustment operation for an optical disk such as a DVD-RAM is performed, a focus bias offset value at which the smallest jitter value of a high frequency signal is detected is set as an optimum focus bias offset value. A physical information data area, which has an embossed form and is recorded in a data area of the disk in a dispersed manner, is detected so that the jitter value of the high frequency signal is measured only for areas other than the detected physical information data area. This achieves a focus bias adjustment operation optimal for an optical disk such as a DVD-RAM, thereby enabling a secure focusing servo operation thereof.

8 Claims, 5 Drawing Sheets

METHOD FOR ADJUSTING FOCUS BIAS IN OPTICAL DISK DEVICE

This Nonprovisional application claims priority under 35 U.S.C. § 119(a) on Patent Application No(s). 03-5556 filed in KOREA on Jan. 28, 2003, the entire contents of which are hereby incorporated by reference.

BACKGROUND OF THE INVENTION

1. Field of the Invention

The present invention relates to a method for adjusting focus bias in an optical disk device, in which a focus bias offset value at which the substantially-smallest jitter value of a high frequency signal is detected is set as an optimal focus bias offset value when a focus bias adjustment operation for an optical disk such as a DVD-RAM (Digital Versatile Disk Random Access Memory) is performed.

2. Description of the Related Art

An optical disk such as a DVD-ROM capable of reproducing lengthy high-quality video data and high-quality audio data, and an optical disk device such as a DVD player capable of reproducing video and audio data recorded on the DVD ROM have been commercialized and come into wide use.

In addition, recently, a rewritable optical disk such as a DVD-RAM and an optical disk device such as a DVD recorder capable of recording video and audio data on the DVD-RAM have been developed and are expected to be commercialized.

When a DVD-RAM is loaded into the optical disk device such as the DVD recorder, the device moves an optical pickup to a lead-in area, a preset initial position, and then performs an initial focusing servo operation. To perform the initial focusing servo operation, the optical disk device detects a just focus point with reference to a focusing error signal outputted from the optical pickup while vertically moving an objective lens in the optical pickup toward and away from the disk.

After completing such an initial focusing servo operation, the optical disk device moves the pickup to a data area to perform a focus bias adjustment operation for a focusing servo operation in the data area.

The focus bias adjustment operation is performed in such a manner that while a focus bias offset value, varying in a stepwise manner, is applied to an actuator provided in the optical pickup, a jitter value of a high frequency signal is detected, and a focus bias offset value at which the smallest jitter value is detected is set as an optimal focus bias offset value. Such a focus bias adjustment operation makes it possible to perform a focusing servo operation optimal for characteristics of the optical pickup or physical characteristics of the DVD-RAM.

However, a physical information data (PID) area having record patterns in an embossed form is recorded, in a dispersed manner, in the data area of an optical disk such as a general DVD-RAM. Thus, when the focus bias adjustment operation is performed, the high frequency signal is detected in a distorted abnormal form in the physical information data area. This causes an error in the jitter value measurement, thus incorrectly setting an optimal focus bias offset value. This results in an error in the focusing servo operation.

SUMMARY OF THE INVENTION

Therefore, the present invention has been made in view of the above problems, and it is an object of the present invention to provide a method for adjusting focus bias in an optical disk device, wherein when a focus bias adjustment operation for an optical disk such as a DVD-RAM is performed, a focus bias offset value at which the smallest jitter value of a high frequency signal is detected is set as an optimum focus bias offset value, and a physical information data area having record patterns in an embossed form is detected, so that the jitter value of the high frequency signal is measured only for areas other than the detected physical information data area.

In accordance with the present invention, the above and other objects can be accomplished by the provision of a method for adjusting focus bias in an optical disk device, comprising the steps of: a) detecting a physical information data area recorded in a data area of the optical disk in a dispersed manner; and b) measuring a jitter value for areas other than the detected physical information data area; and c) repeatedly performing the step a) and the step b) while varying a focus bias offset value in a stepwise manner, and setting an optimal focus bias offset value based upon the jitter values measured while repeatedly performing the step a) and the step b).

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFFERRED EMBODIMENTS

Now, a method for adjusting focus bias in an optical disk device according to preferred embodiments of the present invention will be described in detail with reference to the annexed drawings.

Figure 1:
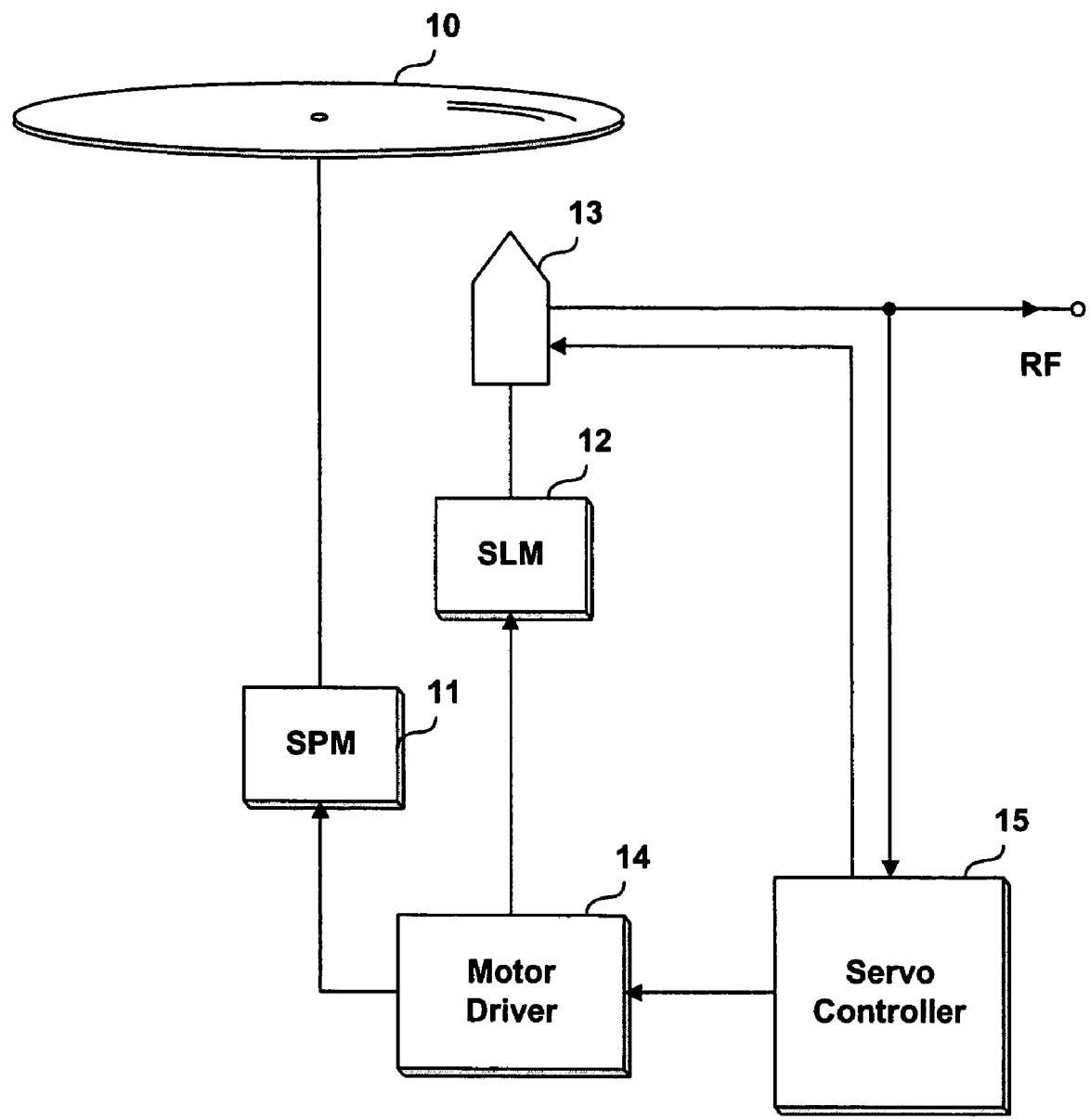
FIGS. 1 and 2 show the configuration of an optical disk device to which a focus bias adjustment method according to the present invention is applied.
Figure 2:
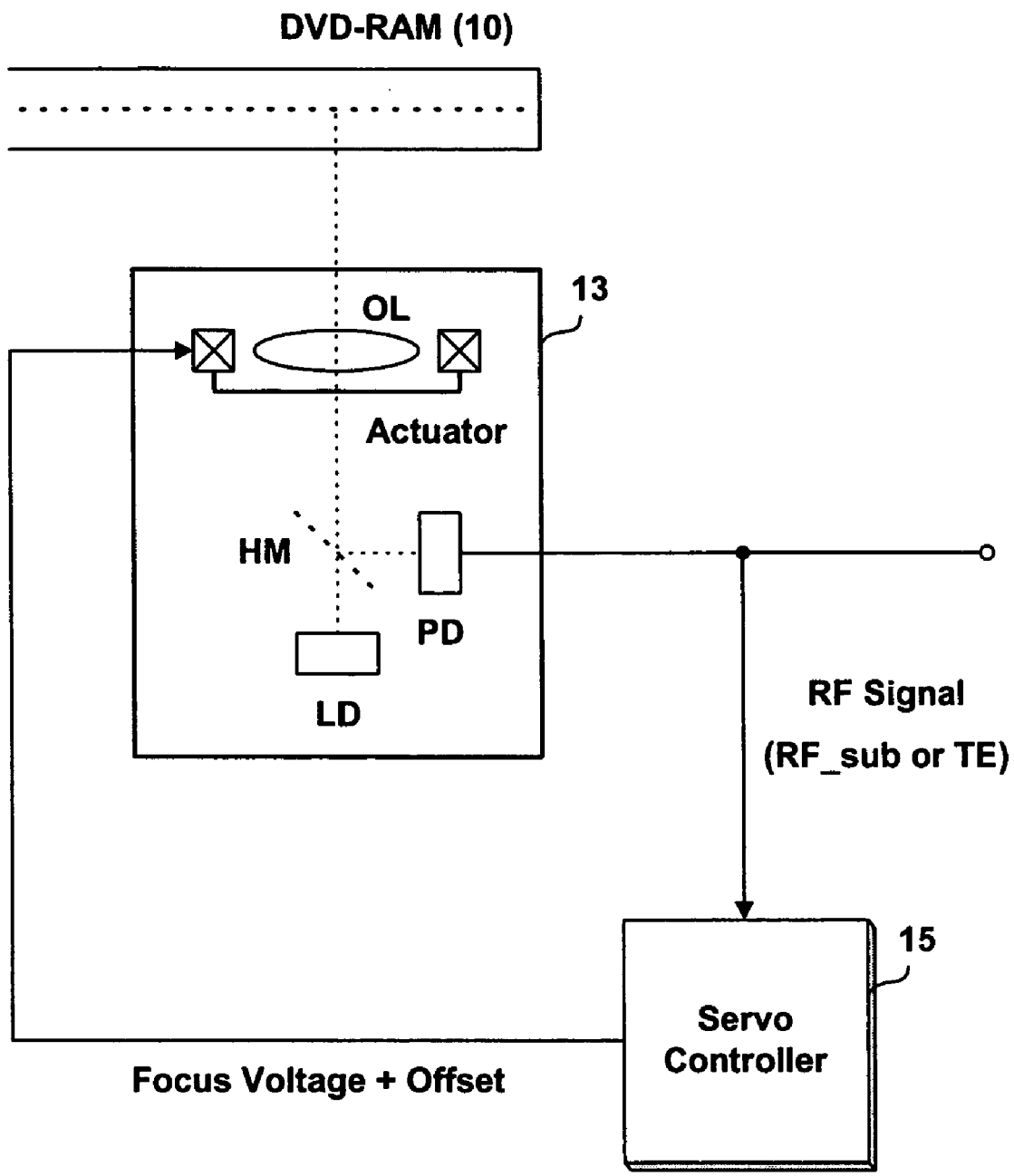

FIGS. 1 and 2 show the configuration of an optical disk device to which the focus bias adjustment method according to the present invention is applied. For example, the optical disk device such as a DVD recorder includes a spindle motor 11, a sled motor 12, an optical pickup 13, a motor driver 14, and a servo controller 15, as shown in the figures.

The optical pickup 13 may be composed of an objective lens (OL), an actuator, a half mirror (HF), a laser diode (LD), and a photo detector (PD). The spindle motor 11 causes an optical disk loaded into the device to rotate at a high speed on the basis of a drive voltage received from the motor driver 14. The sled motor 12 moves the optical pickup 13 in a direction parallel to the optical disk.

The servo controller 15 receives a focusing error signal, a tracking error signal, an RF signal, and RF sub-signals (RF_Sub), which are produced from signals outputted from a photo detector provided in the optical pickup 13. Based on these signals, the servo controller 15 drives the spindle motor 11, the sled motor 12 and an actuator provided in the optical pickup 13 to rotate the optical disk 10 and move the optical pickup 13 and an objective lens vertically (i.e., up and down) or horizontally (i.e., right and left) to perform focusing and tracking servo operations. The RF sub-signal is used to detect the biased degree of a header shown in FIG.

3. The tracking error signal (TE signal) or a center error signal (CE signal) may also be used as the RF sub-signal.

Figure 3:
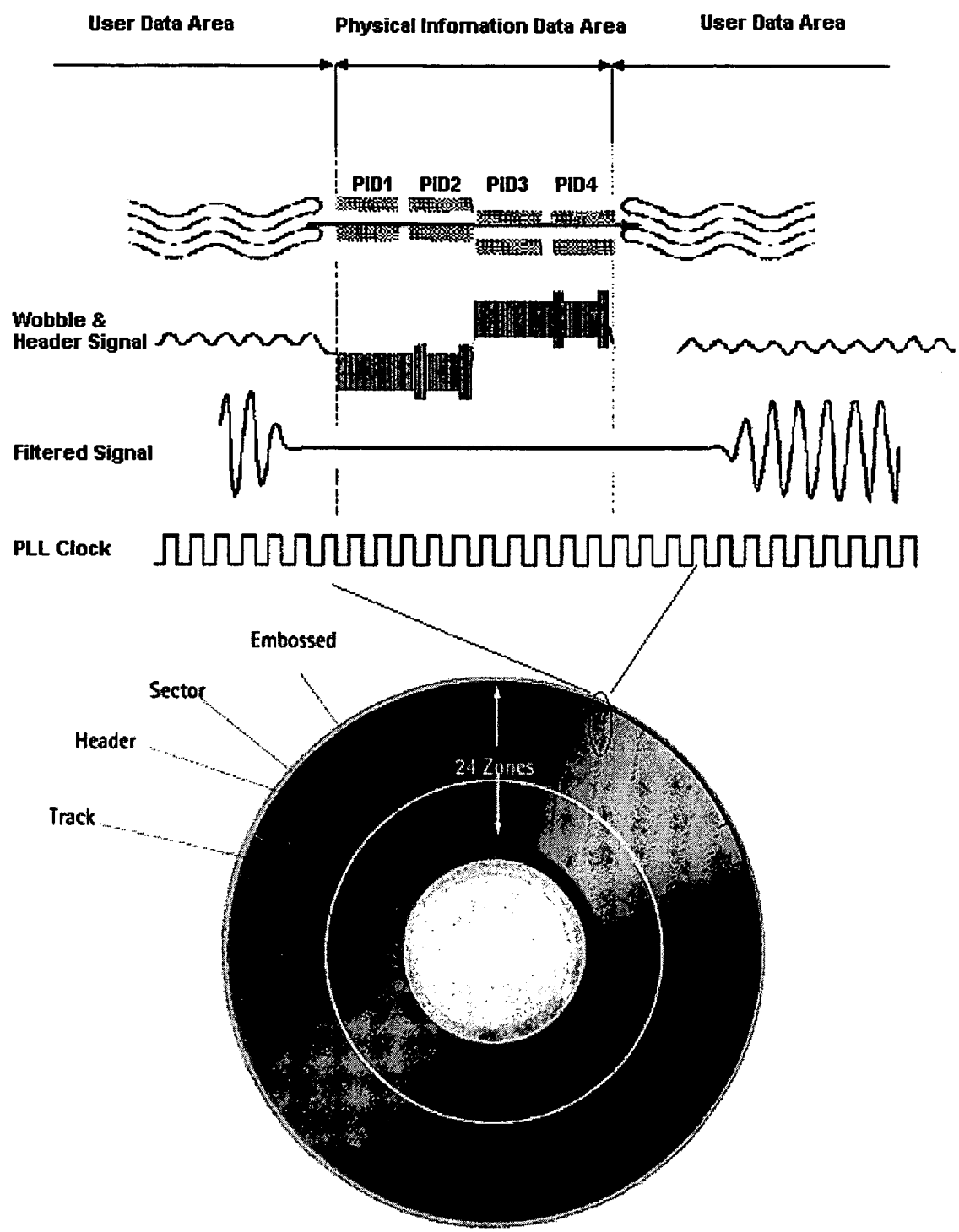
FIG. 3 shows a physical information data area that has an embossed form and is recorded in a data area of a DVD-RAM in a dispersed manner.
Figure 4:
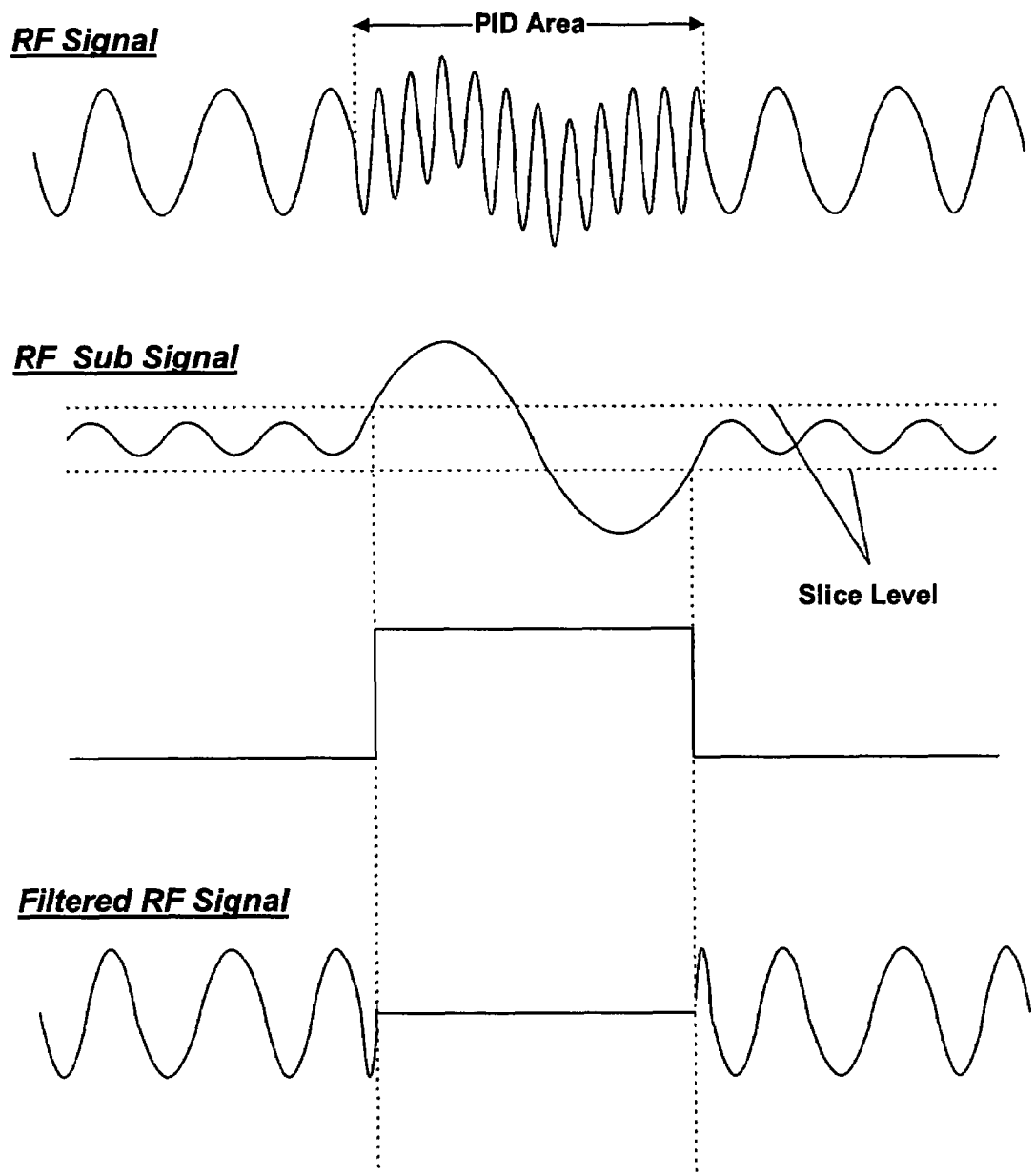
FIG. 4 shows waveforms of signals detected in a method for adjusting focus bias in an optical disk device according to the present invention.

An optical disk (for example, a DVD-RAM) to be loaded into the optical disk device has a physical information data area which is recorded in the data area of the optical disk in a dispersed manner and in which embossed record patterns, as shown in FIG. 3, are recorded asymmetrically with respect to the track. As shown in FIG. 4, an RF signal detected from the embossed record patterns of the physical information data area is different from an RF signal detected from general video and audio data.

Accordingly, when performing a focus bias adjustment operation, the servo controller 15 detects the physical information data area, and measures a jitter value of an RF signal only for areas other than the detected physical information data area. In other words, the servo controller 15 performs the focus bias adjustment operation in the following manner. While applying a focus bias offset value, varying in a stepwise manner, to an actuator provided in the optical pickup 13, the servo controller 15 detects a jitter value of the RF signal only for areas other than a detected physical information data area, and sets a focus bias offset value, at which the smallest jitter value of the RF signal is detected, as an optimal focus bias offset value. This will now be described in detail.

Figure 5:
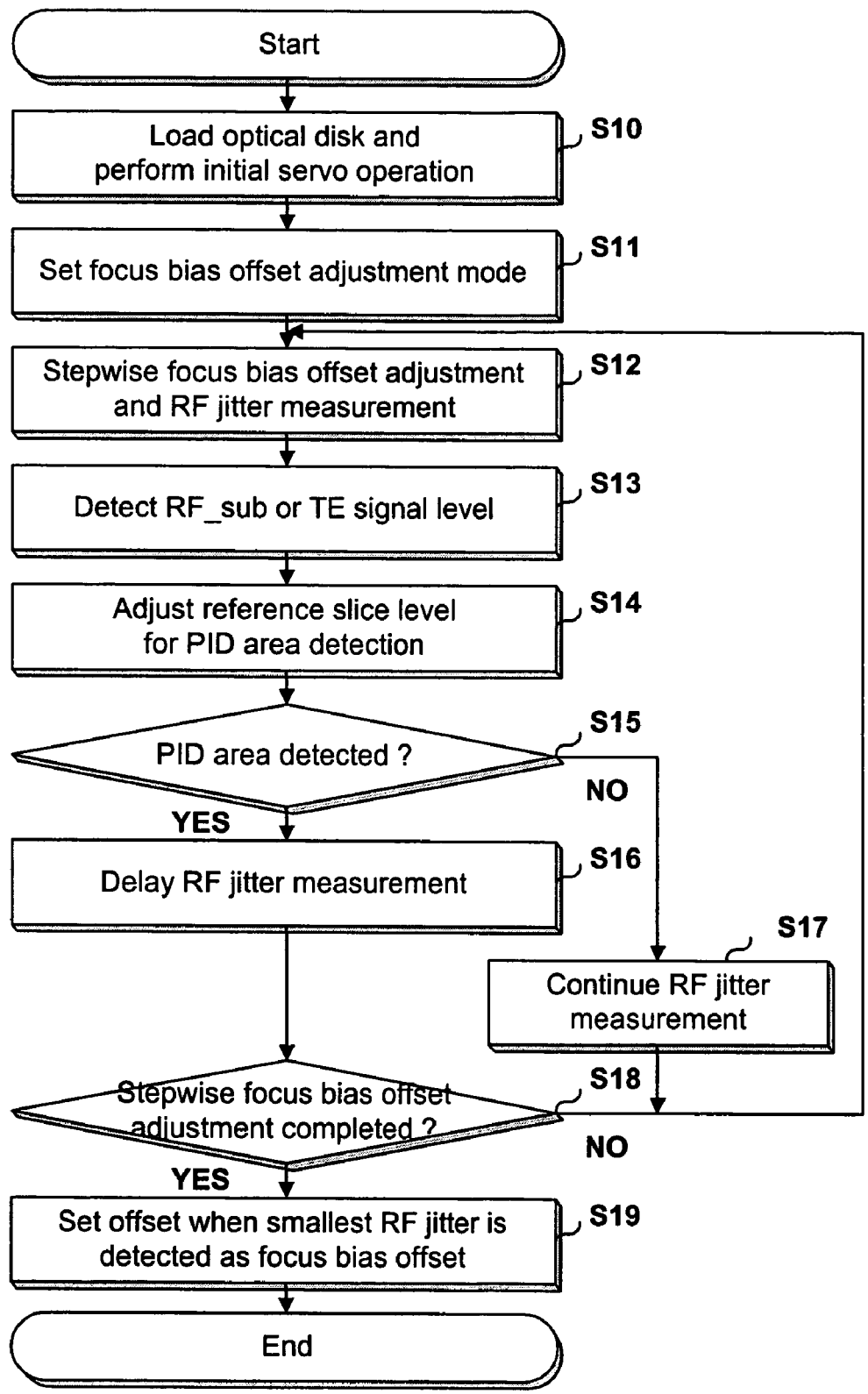
FIG. 5 is a flowchart showing the method for adjusting focus bias in an optical disk device according to the present invention.

FIG. 5 is a flowchart showing a method for adjusting focus bias in an optical disk device according to the present invention. When a DVD-RAM 10 is loaded into an optical disk device such as a DVD recorder, the servo controller 15 drives the spindle motor 11 and the sled motor 12 through the motor driver 14 to rotate the DVD-RAM 10 and move the optical pickup 13 to a preset lead-in position. Next, the servo controller 15 performs an initial focusing servo operation and then an initial tracking servo operation (S10). To perform the initial focusing servo operation, the servo controller 15 detects a just focus point with reference to a focusing error signal outputted from the optical pickup 13 while vertically moving an objective lens in the optical pickup 13 toward and away from a recording layer of the DVD-RAM 10. After the initial focusing servo operation has been completed, the servo controller 15 performs the initial tracking servo operation by detecting a just tracking point with reference to a tracking error signal outputted from the optical pickup 13.

Next, the servo controller 15 moves the pickup 13 to the data area, and sets a focus bias adjustment mode for a focusing servo operation in the data area (S11). Thereafter, while applying a focus bias offset value, varying in a stepwise manner, to an actuator in the optical pickup 13, the servo controller 15 measures a jitter value of an RF signal (S12).

In the meantime, in order to detect a physical information data area in which embossed record patterns are recorded in a dispersed manner as shown in FIG. 3, the servo controller 15 detects maximum/minimum (peak to peak) level values of a tracking error signal or an RF sub-signal such as a center error signal, as shown in FIG. 4.

Next, the servo controller 15 adjusts reference slice levels for detecting the physical information data area on the basis of the detected maximum/minimum level values (S14). For example, two slice levels are adjusted to levels corresponding respectively to one third of the maximum/minimum level values, so as to detect the physical information data area (S15). In the case where the slice levels are fixed, the detection of the physical information data area is not correct since the level value of the center error signal or tracking error signal varies as the focus bias offset value varies in a stepwise manner to be applied to the actuator. Thus, it is possible to detect the physical information data area more correctly by adjusting the slice level to be changed as the focus bias varies.

In the case where the physical information data area is detected in the manner described above, the servo controller 15 delays the operation of measuring a jitter value of an RF signal at the time when the physical information data area is detected, i.e., a jitter value of an abnormal RF signal resulting from the embossed record patterns (S16).

On the other hand, for areas other than the physical information data area, the servo controller 15 continuously performs a general jitter measurement operation of an RF signal (S17).

If the operation of varying the focus bias offset value in a stepwise manner is completed while the above operations S12~S17 are repeated, the servo controller 15 sets a focus bias offset value, at which the smallest of the jitter values measured until that time is detected, as an optimal focus bias offset value (S19).

In this manner, when the focus bias adjustment operation is performed, the jitter value is measured only for areas other than the physical information data area in which the RF signal is detected in a distorted form, thereby preventing error occurrences in the focus bias offset setting.

As apparent from the above description, a method for adjusting focus bias in an optical disk device according to the present invention achieves a focus bias adjustment operation optimal for an optical disk such as a DVD-RAM, thereby enabling a secure focusing servo operation thereof.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for adjusting focus bias in an optical disk device, comprising the steps of:
   a) detecting a physical information data area recorded in a data area of an optical disk in a dispersed manner;
   b) measuring a jitter value for areas other than the detected physical information data area; and
   c) repeatedly performing the step a) and the step b) while varying a focus bias offset value in a stepwise manner, and setting an optimal focus bias offset value based upon the jitter values measured while repeatedly performing the step a) and the step b),
   wherein the physical information data area is detected based upon a center error signal or a tracking error signal.

2. The method according to claim 1, wherein the optical disk has record patterns in an embossed form in the physical information data area, said record patterns being recorded asymmetrically with respect to a track.

3. The method according to claim 1, wherein the physical information data area is detected with reference to a slice level that is adjusted according to a maximum/minimum level of the center error signal or the tracking error signal.

4. The method according to claim 3, wherein the slice level is adjusted to a level corresponding to 1/Nth of the maximum/minimum level of the center error signal or the tracking error signal.

5. The method according to claim 1, wherein a focus bias offset value, from the focus bias offset values varied in a stepwise manner, at which the smallest jitter values is measured is set as the optimal focus bias offset value.

6. The method according to claim 5, wherein a jitter value is not measured for the detected physical information data area.

7. A method for adjusting focus bias in an optical disk device, comprising the steps of:
  a) detecting a physical information data area recorded in a data area of an optical disk in a dispersed manner;
  b) measuring a jitter value for areas other than the detected physical information data area; and
  c) repeatedly performing the step a) and the step b) while varying a focus bias offset value in a stepwise manner, and setting an optimal focus bias offset value based upon the jitter values measured while repeatedly performing the step a) and the step b),
  wherein the optical disk has record patterns in an embossed form in the physical information data area, said record patterns being recorded asymmetrically with respect to a track.

8. A method for adjusting focus bias in an optical disk device, comprising the steps of:
  a) detecting a physical information data area recorded in a data area of an optical disk in a dispersed manner;
  b) measuring a jitter value for areas other than the detected physical information data area; and
  c) repeatedly performing the step a) and the step b) while varying a focus bias offset value in a stepwise manner, and setting an optimal focus bias offset value based upon the jitter values measured while repeatedly performing the step a) and the step b),
  wherein a focus bias offset value, from the focus bias offset values varied in a stepwise manner, at which the smallest jitter values is measured is set as the optimal focus bias offset value, and
  wherein a jitter value is not measured for the detected physical information data area.

* * * * *